US010730630B2

(12) United States Patent
Army et al.

(10) Patent No.: US 10,730,630 B2
(45) Date of Patent: Aug. 4, 2020

(54) LOW PRESSURE PACK

(71) Applicant: HAMILTON SUNDSTRAND CORPORATION, Windsor Locks, CT (US)

(72) Inventors: Donald E. Army, Enfield, CT (US); Frederick Peacos, III, North Scituate, RI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1163 days.

(21) Appl. No.: 14/995,710

(22) Filed: Jan. 14, 2016

(65) Prior Publication Data

US 2017/0203845 A1  Jul. 20, 2017

(51) Int. Cl.
| | |
|---|---|
| B01D 53/26 | (2006.01) |
| B64D 13/02 | (2006.01) |
| B64D 13/06 | (2006.01) |
| B64D 13/08 | (2006.01) |
| F25B 9/00 | (2006.01) |
| F25B 9/06 | (2006.01) |
| F25B 41/04 | (2006.01) |
| F25B 49/02 | (2006.01) |

(52) U.S. Cl.
CPC .......... B64D 13/02 (2013.01); B01D 53/265 (2013.01); B64D 13/06 (2013.01); B64D 13/08 (2013.01); F25B 9/004 (2013.01); F25B 9/06 (2013.01); F25B 41/04 (2013.01); F25B 49/02 (2013.01); B64D 2013/0618 (2013.01); B64D 2013/0648 (2013.01); B64D 2013/0688 (2013.01); F25B 2600/2507 (2013.01); Y02T 50/56 (2013.01)

(58) Field of Classification Search
CPC .................... B64D 13/02; B64D 13/08; B64D 2013/0648; B01D 53/265; F25B 9/004; F25B 9/06; F25B 41/04; F25B 49/02; F25B 2600/2507
USPC .......................................................... 454/76
See application file for complete search history.

(56) References Cited

U.S. PATENT DOCUMENTS

| | | | |
|---|---|---|---|
| 3,270,775 A | * | 9/1966 | Alderson ............ B64C 29/0066 137/625.44 |
| 3,311,161 A | | 3/1967 | Glaspie |
| 4,262,495 A | | 4/1981 | Gupta et al. |
| 5,624,140 A | | 4/1997 | Allen et al. |
| 2005/0166629 A1 | | 8/2005 | Axe et al. |

(Continued)

OTHER PUBLICATIONS

EP SR dated Jun. 28, 2017 in U310717EP, EP application No. 17151193.4, 7 pages.

*Primary Examiner* — Grant Moubry
*Assistant Examiner* — Ryan L Faulkner
(74) *Attorney, Agent, or Firm* — Cantor Colburn LLP

(57) ABSTRACT

A duct is provided and includes a tubular member having an inlet portion, an outlet portion and a central portion interposed between the inlet and outlet portions and a tributary tubular member fluidly coupled to the tubular member at the central portion. The tributary tubular member includes first and second torus sectors defining first and second apertures, respectively, through which an upstream end of the central portion extends. The second torus sector is disposed within the first torus sector to define a sectioned toroidal annulus about the first and second apertures and between an exterior surface of the second torus sector and an interior surface of the first torus sector.

3 Claims, 4 Drawing Sheets

(56) References Cited

U.S. PATENT DOCUMENTS

2006/0021356 A1 2/2006 Milde et al.
2006/0275717 A1 12/2006 Jensen et al.
2007/0125051 A1* 6/2007 Faust .................... B01D 45/16
  55/447

* cited by examiner

LOW PRESSURE PACK

BACKGROUND OF THE DISCLOSURE

The subject matter disclosed herein relates to aircraft environmental control systems (ECS) and, more particularly, to an economical (ECO) low pressure ECS.

The environmental control system (ECS) of an aircraft provides air supply, thermal control and cabin pressurization for the crew and passengers. Avionics cooling, smoke detection and fire suppression are also commonly considered part of an aircraft's environmental control system.

Current ECS design is directed to the development of economical ECS architectures that operate using lower engine pressures as compared to earlier designs in order to save fuel. Such goals suggest that the turbine be configured to operate as a cooling turbine during ground operations and as a power turbine in flight but require an additional connection to cabin air and often rely on relatively large line sizes and duct bend radii that consume a relatively large portion of available packaging volume. The goals also need to be achieved without negatively impacting the water extractor efficiency of conventional systems.

BRIEF DESCRIPTION OF THE DISCLOSURE

According to one aspect of the disclosure, a duct is provided and includes a tubular member and a tributary tubular member fluidly coupled to the tubular member. The tributary tubular member includes a first torus sector defining a first aperture through which the tubular member extends and a second torus sector defining a second aperture to which the tubular member extends. The second torus sector is disposed within the first torus sector to define a sectioned toroidal annulus about the first and second apertures and between an exterior surface of the second torus sector and an interior surface of the first torus sector.

In accordance with additional or alternative embodiments, the tubular member narrows at a border between the inlet and central portions.

In accordance with additional or alternative embodiments, the first aperture has a continuous taper and the second aperture has a non-continuous taper.

In accordance with additional or alternative embodiments, the sectioned toroidal annulus has an increasing thickness.

In accordance with additional or alternative embodiments, the duct further includes an annular fluid collector receptive of fluid from the sectioned toroidal annulus.

According to another aspect of the disclosure, a fluid extractor assembly is provided and includes a main duct having an upstream section, a downstream section oriented transversely with respect to the upstream section and an elbow interposed between the upstream and downstream sections. The main duct includes first and second torus sectors at the elbow to respectively define first and second apertures with the second torus sector disposed within the first torus sector to form a central flow path and a condensate collection gap about the central flow path. The fluid extractor assembly further includes an upstream duct disposed in parallel with the downstream section and to extend through the first aperture and to the second aperture for fluid communication with the downstream section.

In accordance with additional or alternative embodiments, the upstream and downstream sections are perpendicular.

In accordance with additional or alternative embodiments, the downstream section includes a downstream elbow.

In accordance with additional or alternative embodiments, the first aperture is continuously tapered and the second aperture is non-continuously tapered.

In accordance with additional or alternative embodiments, the condensate collection gap has a cross-sectional area that increases in a downstream direction.

In accordance with additional or alternative embodiments, the fluid extractor assembly further includes fluid extractor swirl vanes in the upstream section to drive fluid of a fluid flow proceeding into the central flow path into the condensate collection gap and a fluid extractor receptive of the fluid driven into the condensate collection gap.

In accordance with additional or alternative embodiments, the fluid extractor is operably disposed about the downstream section.

In accordance with additional or alternative embodiments, the fluid extractor includes an annular body defining a condensate settling chamber.

According to another aspect of the disclosure, a low pressure pack is provided and includes ram and bleed air circuits, a condenser, an air cycle machine (ACM), a fluid extractor assembly configured to extract a first fluid from a second fluid and to direct the second fluid from the condenser to the ACM, a duct fluidly coupled with the fluid extractor assembly to direct a third fluid along a substantially straight line into and through the fluid extractor assembly to the ACM and a controllable valve system. The controllable valve system is configured to block the third fluid within the duct and direct the second fluid from the ram air circuit to the ACM through the condenser and through the fluid extractor assembly for first fluid extraction or to block the second fluid upstream from the condenser and direct the third fluid through the fluid extractor assembly to the ACM.

In accordance with additional or alternative embodiments, the first fluid includes water, the second fluid includes ram air and the third fluid includes cabin air.

In accordance with additional or alternative embodiments, the ram air circuit includes a two-pass heat exchanger.

In accordance with additional or alternative embodiments, the ACM includes a turbine and a compressor.

In accordance with additional or alternative embodiments, the fluid extractor assembly includes a first torus sector defining a first aperture, a second torus sector a second aperture, the second torus sector being disposed within the first torus sector to form a central flow path and a condensate collection gap about the central flow path, fluid extractor swirl vanes to drive the first fluid into the condensate collection gap and a fluid extractor receptive of the first fluid from the condensate collection gap.

In accordance with additional or alternative embodiments, the duct is fluidly coupled with the fluid extractor assembly downstream from the fluid extractor swirl vanes.

In accordance with additional or alternative embodiments, the controllable valve system includes a heat exchanger diverter valve operably disposed upstream from the condenser and a turbine control valve operably disposed within the duct.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

As will be described below, a power turbine control valve (TCV) and a water extractor (WE) are combined and consolidated into a single element for an aircraft. As such, an additional connection to the cabin is provided to the power turbine with limited or no bends in the connection. The connection is also downstream from water collection swirl vanes such that water extractor efficiency is maintained. The power turbine can thus act as a power turbine in flight and as a cooling turbine in ground operations.

Figure 1:
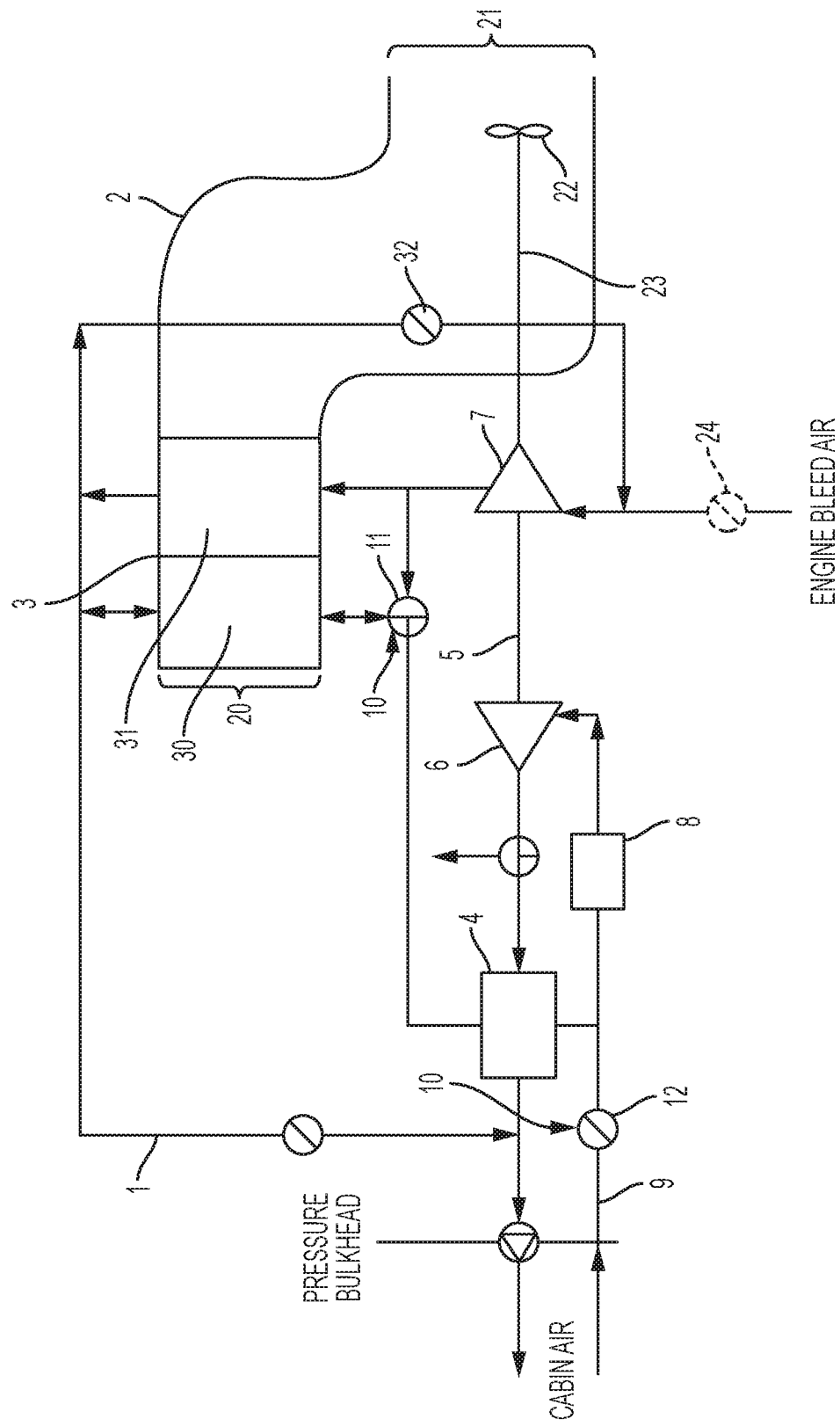
FIG. 1 is a schematic illustration of a low pressure pack of an aircraft in accordance with embodiments.
Figure 2:
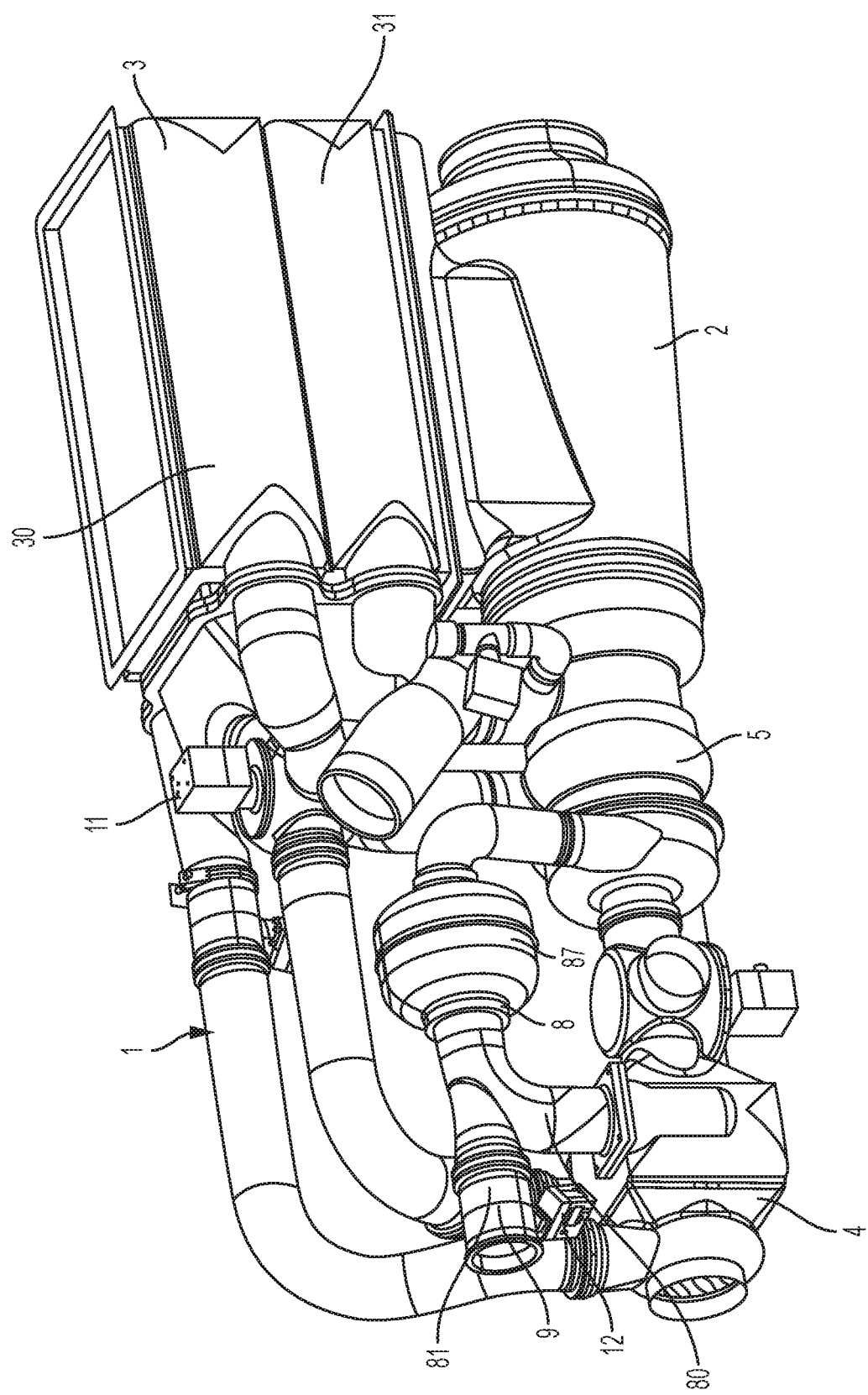
FIG. 2 is a perspective view of the low pressure pack of FIG. 1.

With reference to FIGS. 1 and 2, a low pressure pack 1 is provided for use with an aircraft. The low pressure pack 1 includes a ram air circuit 2, which itself includes a two-pass heat exchanger 3, a condenser 4, an air cycle machine (ACM) 5, which includes a turbine 6 and a compressor 7, a fluid extractor assembly 8, which is configured to extract a first fluid (e.g., water) from a second fluid (e.g., engine bleed air) and to direct the second fluid from the condenser 4 to the turbine 6 of the ACM 5, a duct 9 and a controllable valve system 10. The duct 9 is fluidly coupled with the fluid extractor assembly 8 to direct a third fluid (e.g., cabin air) from the cabin along a substantially straight line into and through the fluid extractor assembly 8 to the turbine 6 of the ACM 5.

The controllable valve system 10 includes a heat exchanger diverter valve 11, which is operably disposed upstream from the condenser 4 and a turbine control valve 12, which is operably disposed within the duct 9. The controllable valve system 10 may thus be configured to assume a first state in which the heat exchanger diverter valve 11 is open and the turbine control valve 12 is closed whereby the closed turbine control valve 12 blocks the third fluid within the duct 9 and the heat exchanger diverter valve 11 is opened to permit the second fluid to be directed from the ram air circuit 2 to the turbine 6 of the ACM 5 through the condenser 4 and through the fluid extractor assembly 8 for first fluid extraction within the fluid extractor assembly 8 (see FIG. 3). Alternatively, the controllable valve system 10 may be configured to assume a second state in which the heat exchanger diverter valve 11 is closed and blocks the second fluid upstream from the condenser 4 and the turbine control valve 12 is open to permit the third fluid to be directed through the fluid extractor assembly 8 to the turbine 6 of the ACM 5 (see FIG. 4).

The ram air circuit 2 may include an inlet section 20 and an outlet section 21 downstream from the inlet section 20 and is configured to form a pathway for airflow proceeding from the inlet section 20 to the outlet section 21. A fan 22 may be disposed within the outlet section 21 to aerodynamically interact with ram circuit 2 airflow. Shaft 23 is coupled to the turbine 6, compressor 7 and fan 22 of the ACM 5 such that the turning of turbine 6 will rotate compressor 7 to compress air received from flow control valve 24 and induce flow in ram circuit 2. The two pass heat exchanger 3 of the ram air circuit 2 may include a first stage heat exchanger 30 at the inlet section 20 and a second stage heat exchanger 31 adjacent to the first stage heat exchanger 30. Fluid flow from the flow control valve 24 is directed either toward and through the second stage heat exchanger 31 or to the heat exchanger diverter valve 11. Fluid flowing through the second stage heat exchanger 31 can then flow either toward quench valve 32 and the compressor 7 or toward and through the first stage heat exchanger 30 and then the heat exchanger diverter valve 11.

Figure 3:
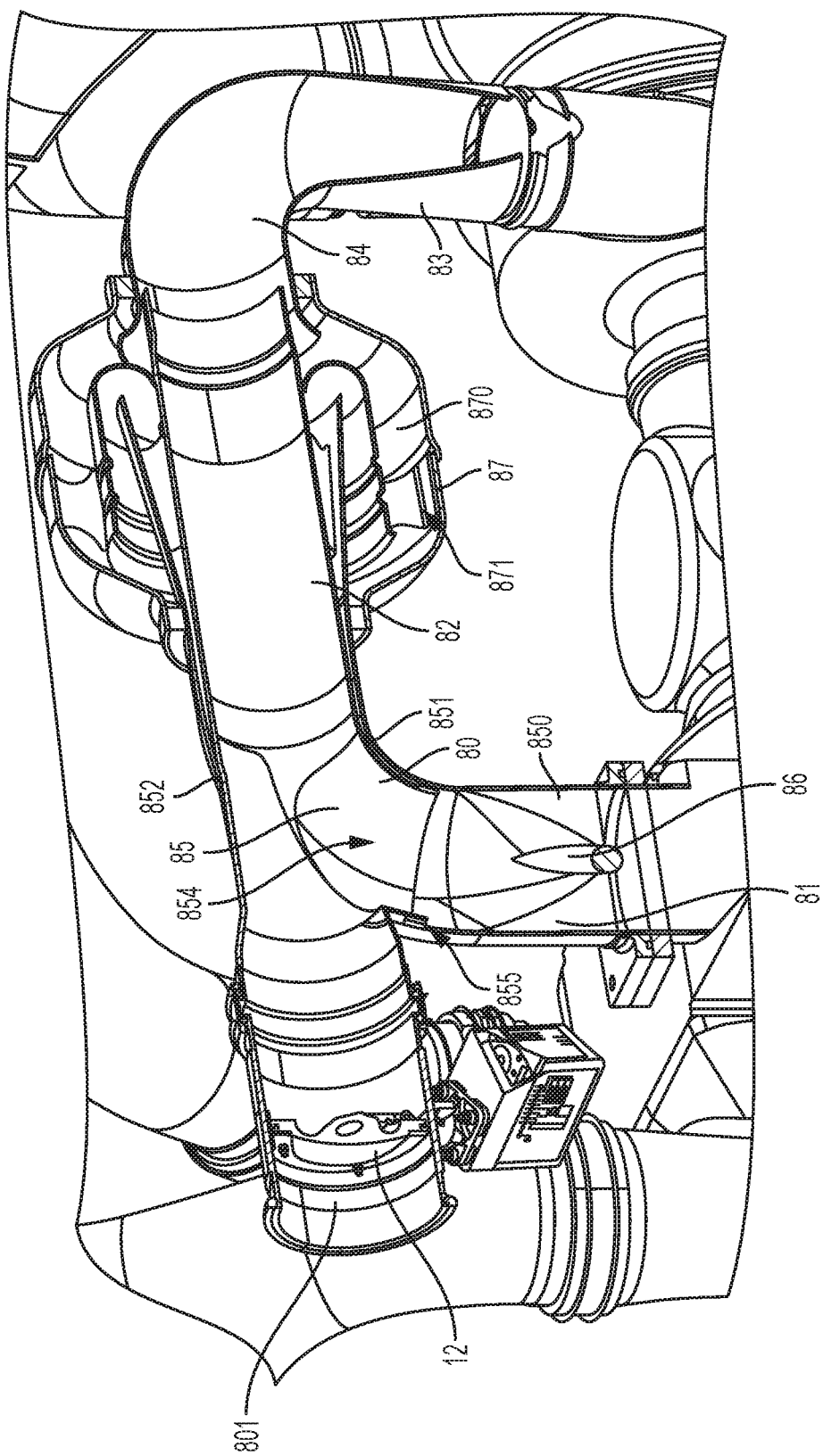
FIG. 3 is an enlarged view of a portion of the low pressure pack of FIGS. 1 and 2 in a first state.
Figure 4:
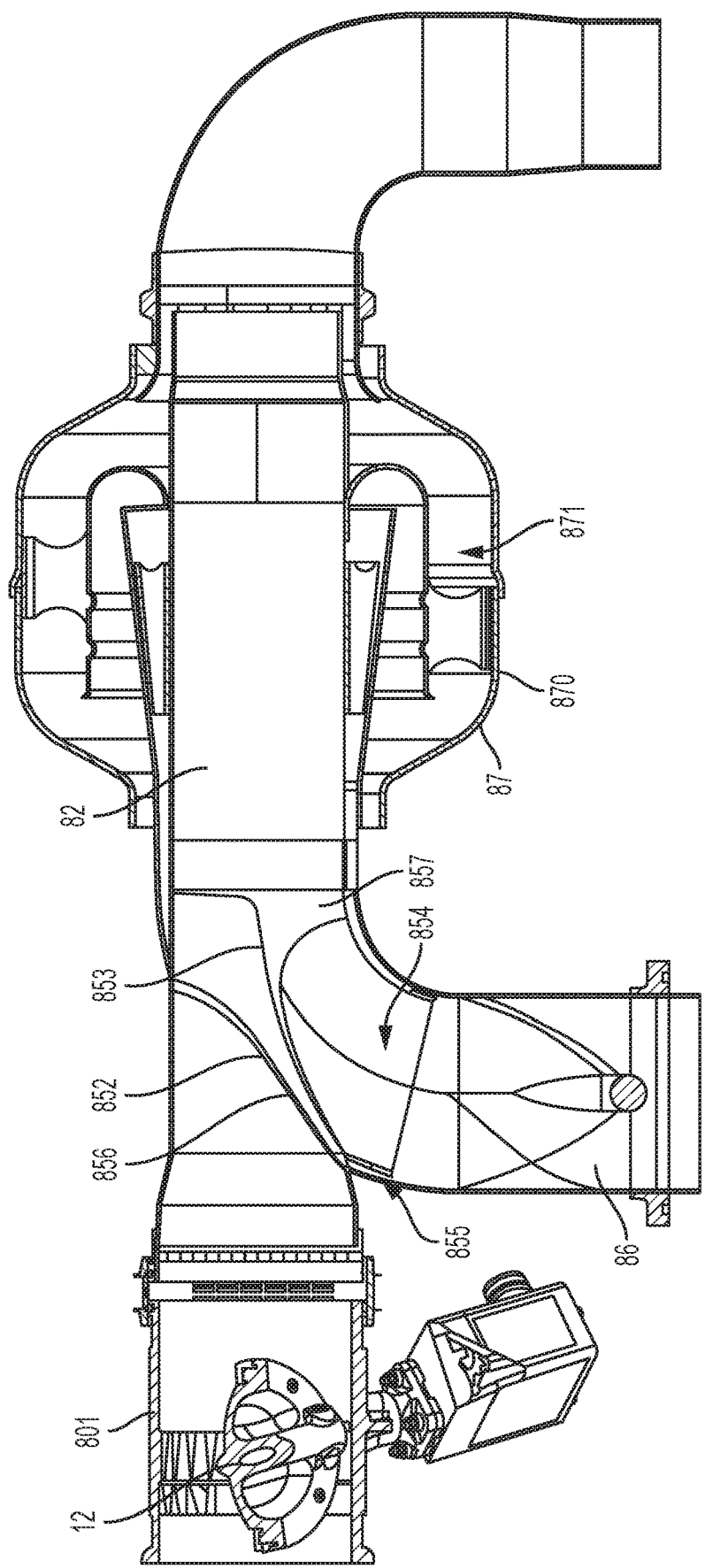
FIG. 4 is an enlarged view of a portion of the low pressure pack of FIGS. 1 and 2 in a second state.

With reference to FIGS. 3 and 4, fluid permitted to flow through the heat exchanger diverter valve 11 as second fluid flows to and through the condenser 4 and then to and through the fluid extractor assembly 8. The fluid extractor assembly 8 includes a tributary tubular member (hereinafter referred to as a main duct 80) and a tubular member (hereinafter referred to as an upstream duct 801). The main duct 80 has an upstream section 81 that is fluidly coupled to an outlet of the condenser 4, a first downstream section 82 that is oriented transversely (e.g., perpendicularly) with respect to the upstream section 81, a second downstream section 83 that is oriented transversely (e.g., perpendicularly) with respect to the first downstream section 82 and is fluidly coupled with the turbine 6 of the ACM 5, a downstream section elbow 84 that is fluidly interposed between the first and second downstream sections 82 and 83. The main duct 80 further includes a main duct elbow 85 that is fluidly interposed between the upstream section 81 and the first downstream section 82.

The main duct elbow 85 is formed such that the main duct 80 also includes a first torus sector 850 and a second torus sector 851 at the main duct elbow 85 and at least an upstream portion of the first downstream section 82. The first torus sector 850 is formed to define a first aperture 852 and the second torus sector 851 is formed to define a second aperture 853. The first torus sector 850 may be provided as an exterior shell of the main duct elbow 85 and the second torus sector 851 is disposed within the first torus sector 850 beginning at the main duct elbow 85 and continuing through the first downstream section 82. The second torus sector 851 thus forms a central flow path 854 within an interior surface thereof and a condensate collection gap 855 of increasing cross-sectional flow area in a downstream direction about the central flow path 854 and between an exterior surface of the second torus sector 851 and an interior surface of the first torus sector 850.

The upstream duct 801 is disposed substantially in parallel with the first downstream section 82 and extends through the first and second apertures 852 and 853 to thereby provide for fluid communication with the downstream section 82. As such, as the third fluid moves through the upstream duct 801, the first aperture 852 and the second aperture 853 and from there into and through the first downstream section 82, the third fluid flows along a substantially straight line and is exposed to limited or no pipe bends and corresponding changes of flow direction.

As shown in FIG. 4, the first aperture 852 may have a continuous taper 856 that has a steadily increasing positive radius of curvature, an inflexion point and then a steadily increasing negative radius of curvature along each side of the upstream duct 801. The second aperture 853, on the other hand, may have a non-continuous taper 857 that may be characterized with a primary angular edge that splits into secondary angular edges on each side of the second torus sector 851.

The fluid extractor assembly 8 may include fluid extractor swirl vanes 86 and a fluid extractor 87. The fluid extractor swirl vanes 86 are disposable in the upstream section 81 and are configured to rotatably drive the first fluid, which is contained within or carried by the second fluid proceeding into the central flow path 854, into the condensate collection gap 855. The upstream duct 801 is fluidly communicative with the main duct 80 downstream from the fluid extractor swirl vanes 86. The fluid extractor 87 is receptive of the first fluid from the condensate collection gap 855 and includes an annular body 870, which is formed to define a condensate settling chamber 871, and which is operably disposed about the first downstream section 82.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A duct, comprising: a tubular member; and a tributary tubular member comprising a main duct elbow and a downstream section downstream from the main duct elbow, the tributary tubular member being fluidly coupled to the tubular member and, comprising
    a first torus sector provided as an exterior shell of the main duct elbow and having a first edge defining a first aperture through which the tubular member extends to thereby permit a transmission of air along the tubular member and through the first aperture; and
    a second torus sector disposed within the first torus sector beginning at the main duct elbow and having a second edge defining a second aperture to which the tubular member extends to thereby permit the transmission of air along the tubular member and to and through the second aperture, and
    the second torus sector being disposed within the first torus sector beginning at the main duct elbow and continuing through the downstream section to define an annulus about the first and second apertures and between an exterior surface of the second torus sector and an interior surface of the first torus sector, and
    wherein: the annulus is formed as a condensate collection gap between the second torus sector and the first torus sector, and the tributary tubular member further comprises an fluid extractor which is receptive of fluid from the condensate collection gap.

2. The duct according to claim 1, wherein the first edge defining the first aperture has a continuous taper and the second edge defining the second aperture has a non-continuous taper.

3. The duct according to claim 1, wherein the annulus has a cross-sectional area that increases in a downstream direction.

\* \* \* \* \*